United States Patent
Cruz Mota et al.

(10) Patent No.: US 9,407,646 B2
(45) Date of Patent: Aug. 2, 2016

(54) APPLYING A MITIGATION SPECIFIC ATTACK DETECTOR USING MACHINE LEARNING

(71) Applicant: Cisco Technology, Inc., San Jose, CA (US)

(72) Inventors: Javier Cruz Mota, Assens (CH); Andrea Di Pietro, Lausanne (CH); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 14/338,909

(22) Filed: Jul. 23, 2014

(65) Prior Publication Data

US 2016/0028754 A1    Jan. 28, 2016

(51) Int. Cl.
    *H04L 29/06* (2006.01)

(52) U.S. Cl.
    CPC ........ *H04L 63/1416* (2013.01); *H04L 63/1425* (2013.01); *H04L 63/1458* (2013.01)

(58) Field of Classification Search
    CPC ............ H04L 63/1416; H04L 63/1458; H04L 63/1425; H04L 29/06911; H04L 29/06925; H04L 29/06931; H04L 29/06938; G06F 21/55
    See application file for complete search history.

(56) References Cited

U.S. PATENT DOCUMENTS

| | | | |
|---|---|---|---|
| 7,873,583 B2 | 1/2011 | Laxman et al. | |
| 8,065,722 B2 | 11/2011 | Barford et al. | |
| 8,103,727 B2 | 1/2012 | Lin | |
| 8,504,504 B2 | 8/2013 | Liu | |
| 8,682,812 B1 | 3/2014 | Ranjan | |
| 2004/0148520 A1* | 7/2004 | Talpade | H04L 63/1458 726/22 |
| 2005/0286772 A1 | 12/2005 | Albertelli | |
| 2007/0094728 A1 | 4/2007 | Julisch et al. | |
| 2007/0239999 A1* | 10/2007 | Honig | G06F 21/554 713/194 |
| 2008/0083029 A1 | 4/2008 | Yeh et al. | |

* cited by examiner

*Primary Examiner* — William Goodchild
(74) *Attorney, Agent, or Firm* — Parker Ibrahim & Berg LLC; James M. Behmke; Stephen D. LeBarron

(57) ABSTRACT

In one embodiment, a device in a network detects a network attack using aggregated metrics for a set of traffic data. In response to detecting the network attack, the device causes the traffic data to be clustered into a set of traffic data clusters. The device causes one or more attack detectors to analyze the traffic data clusters. The device causes the traffic data clusters to be segregated into a set of one or more attack-related clusters and into a set of one or more clusters related to normal traffic based on an analysis of the clusters by the one or more attack detectors.

19 Claims, 13 Drawing Sheets

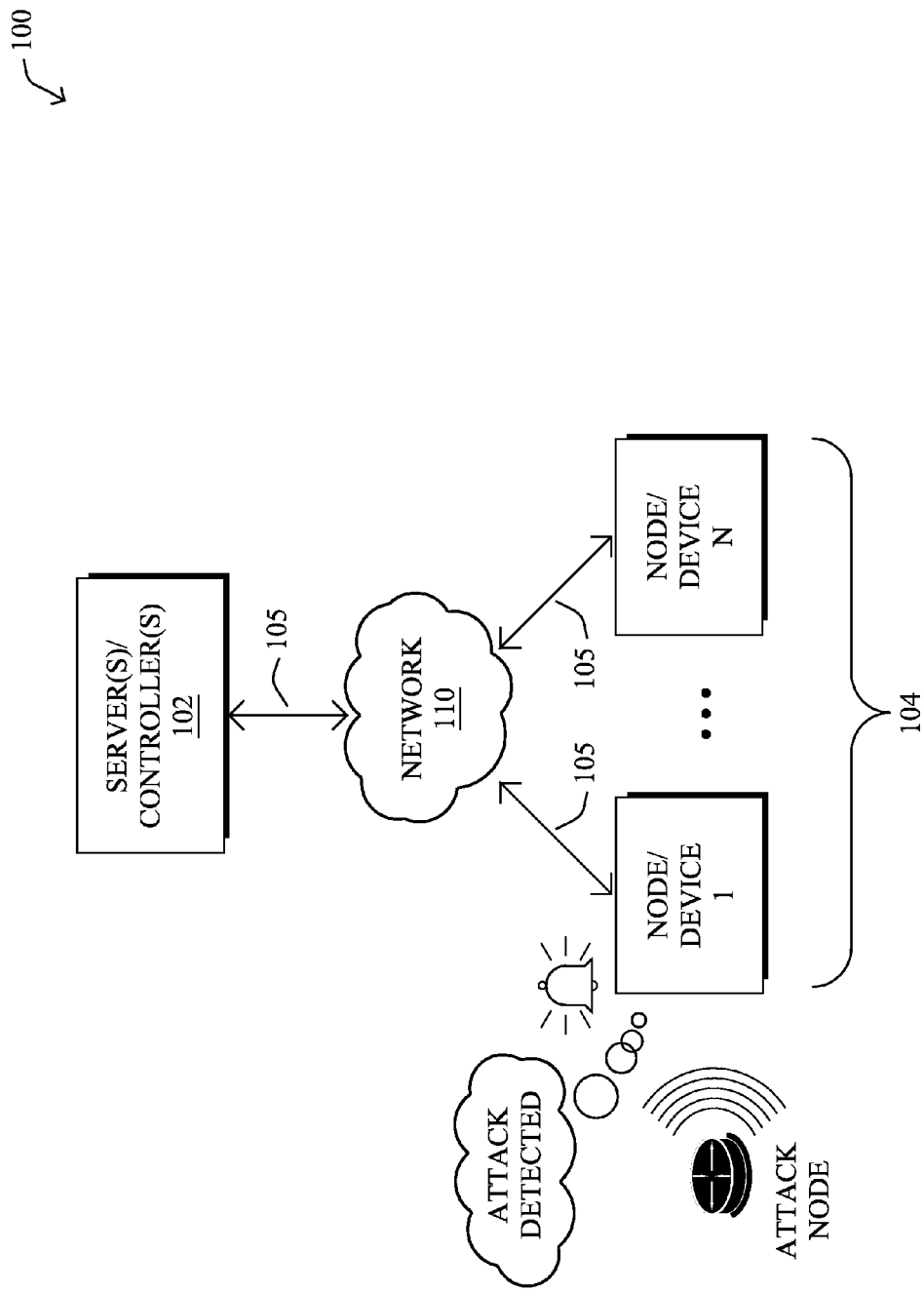

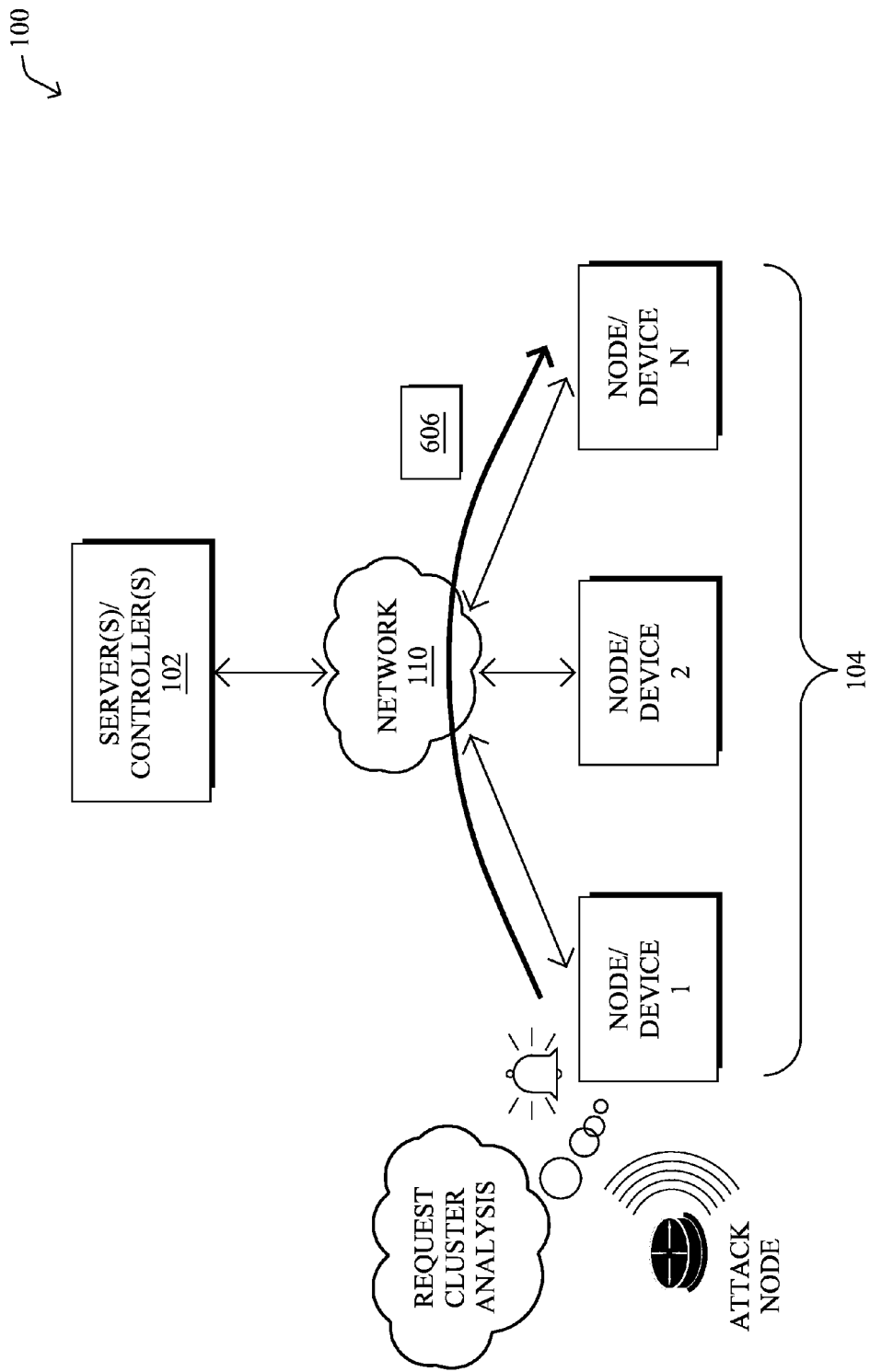

APPLYING A MITIGATION SPECIFIC ATTACK DETECTOR USING MACHINE LEARNING

TECHNICAL FIELD

The present disclosure relates generally to computer networks, and, more particularly, to applying a mitigation specific attack detector using machine learning.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3B illustrate an example of a network attack being detected;

FIGS. 6A-6F illustrate examples of cluster-based attack detection being used to segregate out attack-related traffic data.

DESCRIPTION OF EXAMPLE EMBODIMENTS

Overview

Figure 1:
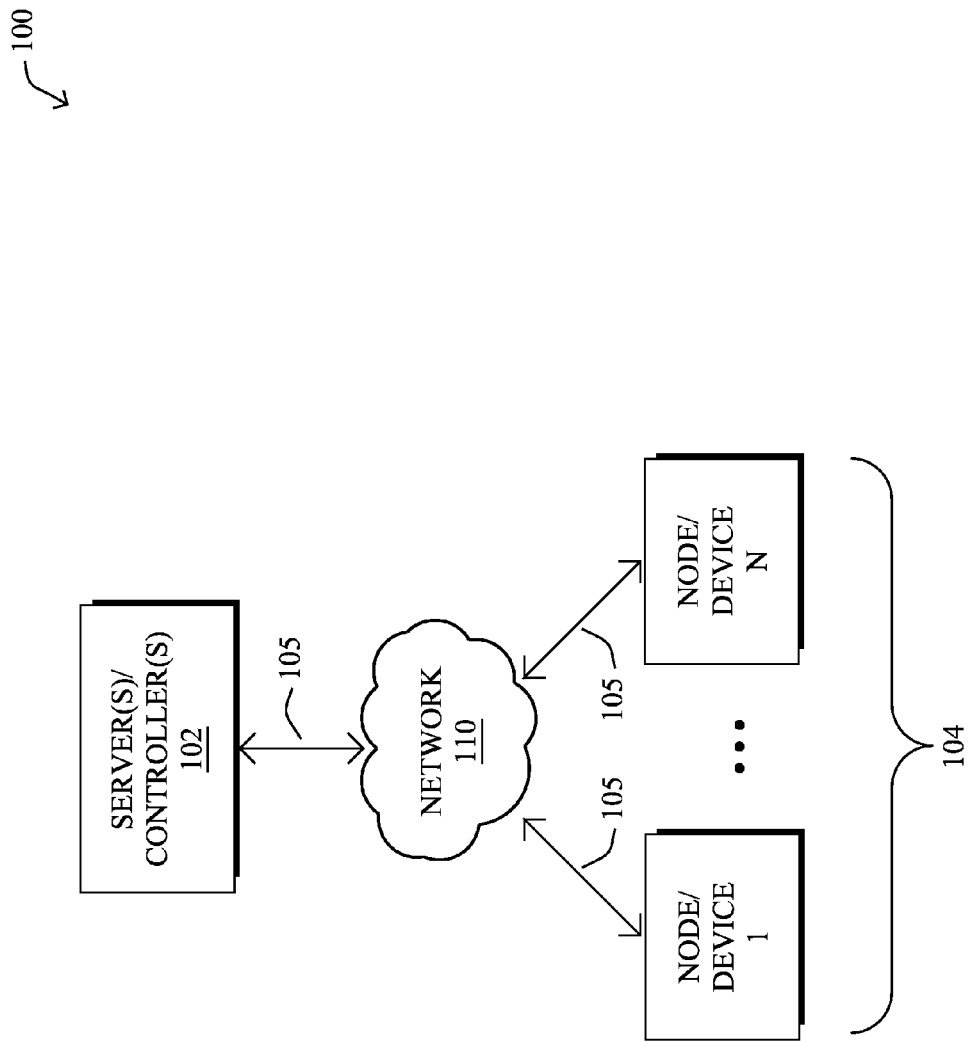
FIG. 1 illustrates an example communication network.

According to one or more embodiments of the disclosure, a device in a network detects a network attack using aggregated metrics for a set of traffic data. In response to detecting the network attack, the device causes the traffic data to be clustered into a set of traffic data clusters. The device causes one or more attack detectors to analyze the traffic data clusters. The device causes the traffic data clusters to be segregated into a set of one or more attack-related clusters and into a set of one or more clusters related to normal traffic based on an analysis of the clusters by the one or more attack detectors.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in network 110.

Nodes/devices 104 may include any form of networking device used to generate, forward, receive, etc., traffic within network 110. For example, nodes/device 104 may include, but are not limited to, routers, switches, computers, or the like.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
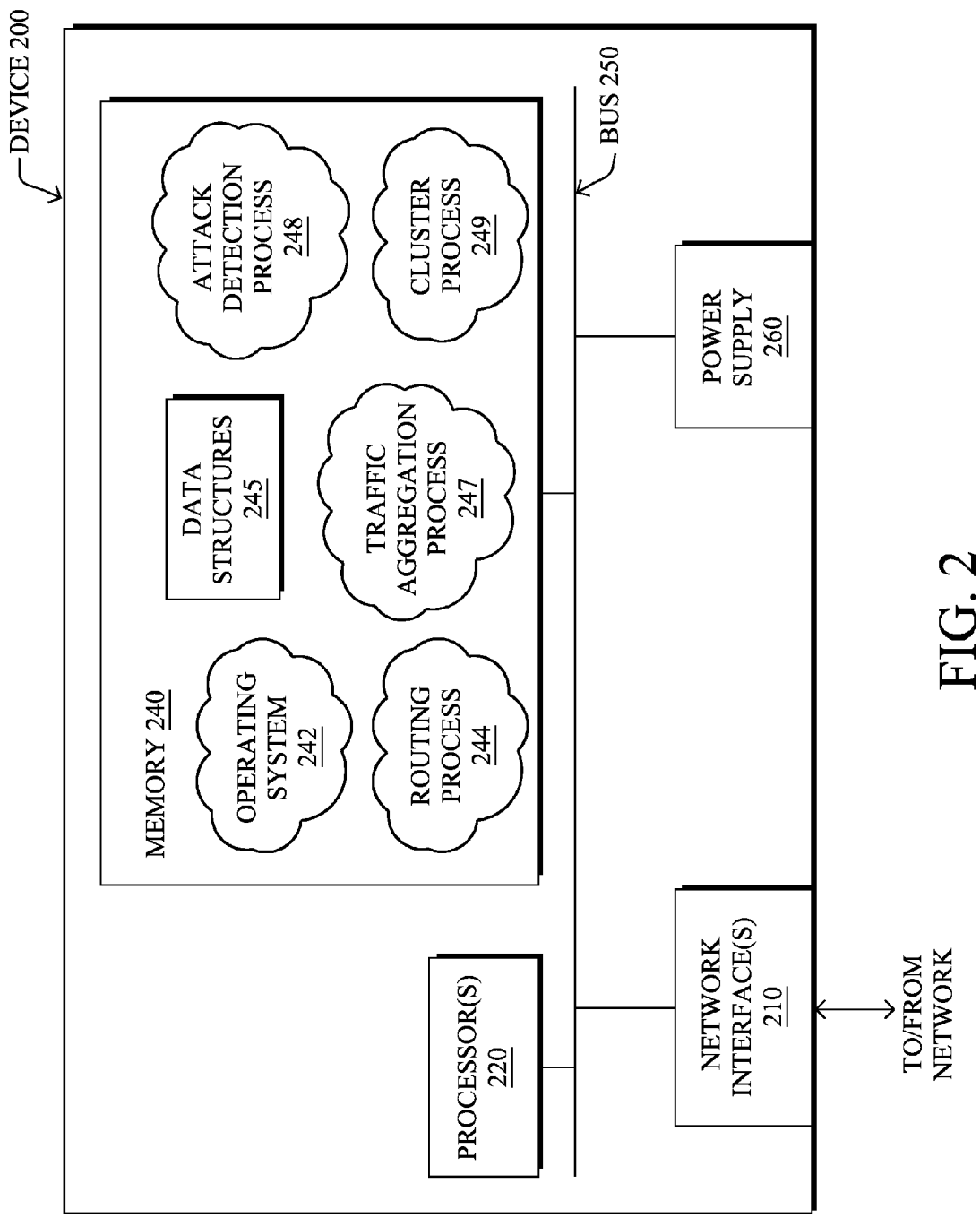
FIG. 2 illustrates an example network device/node.

FIG. 2 is a schematic block diagram of an example node/device 200 that may be used with one or more embodiments described herein, e.g., as any of the devices shown in FIG. 1 (e.g., a server/controller 102, a node/device 104, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a traffic aggregation process 247, an attack detection process 248, and/or a cluster process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments attack detection process 248 may use machine learning to detect an attack. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network. Further categories that represent specific types of attacks may also be used (e.g., a "UDP flooding attack" label, etc.). Said differently, attack detection process 248 may be configured to assign one of a set of output labels (e.g., "normal," "attack," etc.) to an input set of network observations or metrics. In various cases, an applied label may also have an associated probability determined by the learning machine (e.g., a confidence score associated with an applied label, etc.).

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

Traffic aggregation process 247, as described in greater detail below, includes computer executable instructions executed by the processor 220 to perform functions regarding the aggregation of traffic data into inputs for attack detection process 248. For example, traffic aggregation process 247 may determine an average flow duration, average number of bytes of a flow, an average number of packets, a proportion of traffic attributable to a particular application, other statistical properties, or any other aggregated traffic metrics for analysis by attack detection process 248.

Cluster process 249, as detailed below, includes computer executable instructions executed by the processor 220 to perform functions regarding the clustering of traffic data for input to attack detection process 248. In general, clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, density-based special clustering of applications with noise (DBSCAN), or Mean-Shift, among others. Such clusters may be used, in some cases, as input to one or more cluster-centric attack detectors in attack detection process 248. In other words, attack detection process 248 may include one or more attack detectors that are configured to detect an attack based on aggregated metrics for a set of traffic records and/or one or more attack detectors that are configured to specifically analyze clustered records.

Figure 3B:
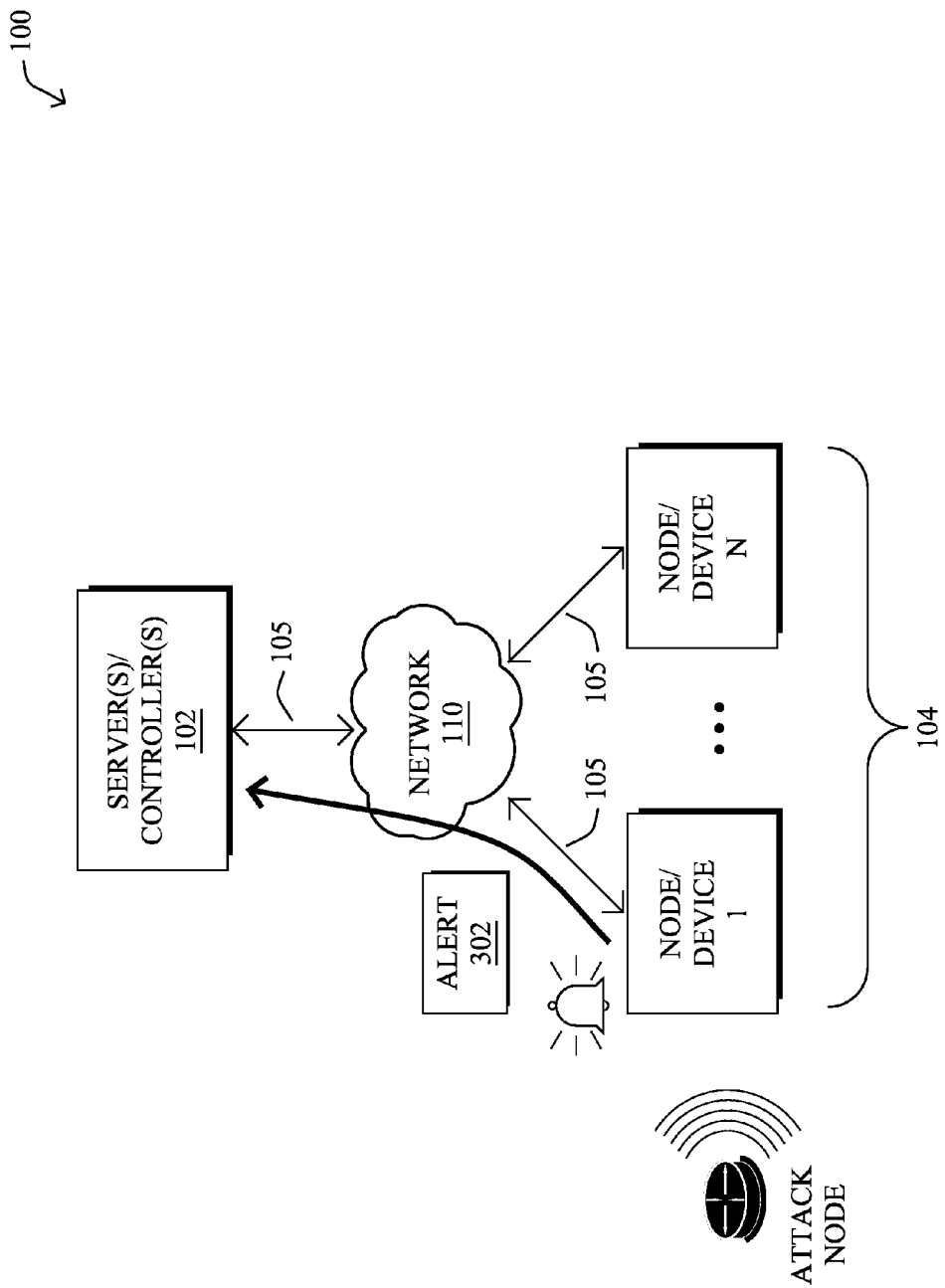

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248). In general, the attack detector process may be operable to observe traffic behavior and apply a label (e.g., a classification) to the observed traffic behavior. For example, the node/device 104 under attack may determine that a sharp increase in request traffic is indicative of an attack (e.g., the observed behavior may be labeled as an attack by the device's machine learning process). In such a case, as shown in FIG. 3B, the node/device 104 may initiate countermeasures, such as sending an alert 302 to one of the servers/controller 102 (e.g., to alert a network administrator), etc.

As noted above, an attack detector using machine learning may be very capable of detecting when an attack is present by analyzing aggregated metrics for a set of traffic records. However, identifying which specific traffic flows are attack-related remains challenging. In particular, while the attack detector may be well suited for analyzing the set of records as a whole, its performance may be undermined if it is used to analyze only a certain subset of the set of traffic records. For example, if data regarding only a certain type of traffic (e.g., HTTP traffic, etc.) is used as inputs to the attack detector, the attack detector may not be able to correctly analyze the input data, since the metrics for the HTTP traffic may differ from that of the aggregated metrics for all of the traffic types (e.g., HTTP traffic, UDP traffic, etc.).

Applying a Mitigation Specific Attack Detector Using Machine Learning

The techniques herein provide an attack mitigation mechanism that allows traffic to be segregated (e.g., flagged) based on whether the traffic is attack-related or normal traffic. In some aspects, once an attack has been detected using aggregated metrics for the entire set of traffic data, the set of traffic data may be clustered into various subsets and provided to one or more other attack detectors that have been specifically trained to analyze the clusters. In some aspects, discovery techniques are introduced that allow discovery of the network devices that can perform clustering on the set of traffic data. Techniques are also introduced that allow discovery of the network devices that host attack detectors that are specifically trained to analyze the traffic data clusters. Such attack detectors may be configured to flag a traffic data cluster as being attack-related and/or related to a specific type of attack. Mechanisms are also introduced for communicating with the device that will perform the clustering and with the device that will perform the classification of clusters.

Specifically, according to one or more embodiments of the disclosure as described in detail below, a device in a network detects a network attack using aggregated metrics for a set of traffic data. In response to detecting the network attack, the device causes the traffic data to be clustered into a set of traffic data clusters. The device causes one or more attack detectors to analyze the traffic data clusters. The device causes the traffic data clusters to be segregated into a set of one or more attack-related clusters and into a set of one or more clusters related to normal traffic based on an analysis of the clusters by the one or more attack detectors.

Illustratively, the techniques described herein may be performed by hardware, software, and/or firmware, such as in accordance with the processes 244 and 247-249, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, assume that a particular attack detector detects an attack of type T and classifies the attack using aggregated metrics for a set of traffic records. In such a case, the device hosting the attack detector may store a cache of the disaggregated data that led to the attack detection. Such data may also be used to cluster the data and perform attack detection/classification on the data on a per-cluster basis. In various embodiments, the original attack detection on the full set of traffic records, the clustering of the traffic records into data clusters, and the analysis of the data clusters may be performed locally by a single network device or distributed across different network devices. Accordingly, the following terms are used herein:

Requestor: the device that detects the attack using a set of traffic data (e.g., aggregated metrics for an entire set of traffic data) and subsequently requests clustering of the traffic data and classification of the clusters.

$C_i$: clustering technique "i." For example $C_i$ can be k-means clustering, DBSCAN clustering, etc. Notably, any existing clustering technique can be used.

$CD_{ij}$: a cluster-centric attack detector that is compatible with clustering technique "i" and attack type "j". $CD_{ij}$ may use any type of machine learning, to determine whether a specific type of cluster is associated with a specific type of attack (e.g., ANNs, SVMs, random forests, etc.). For instance, $CD_{ij}$ can be an ANN classifier trained on aggregated data per cluster using k-means ("i") for detecting HTTP Slow Loris attacks ("j").

Figure 4:
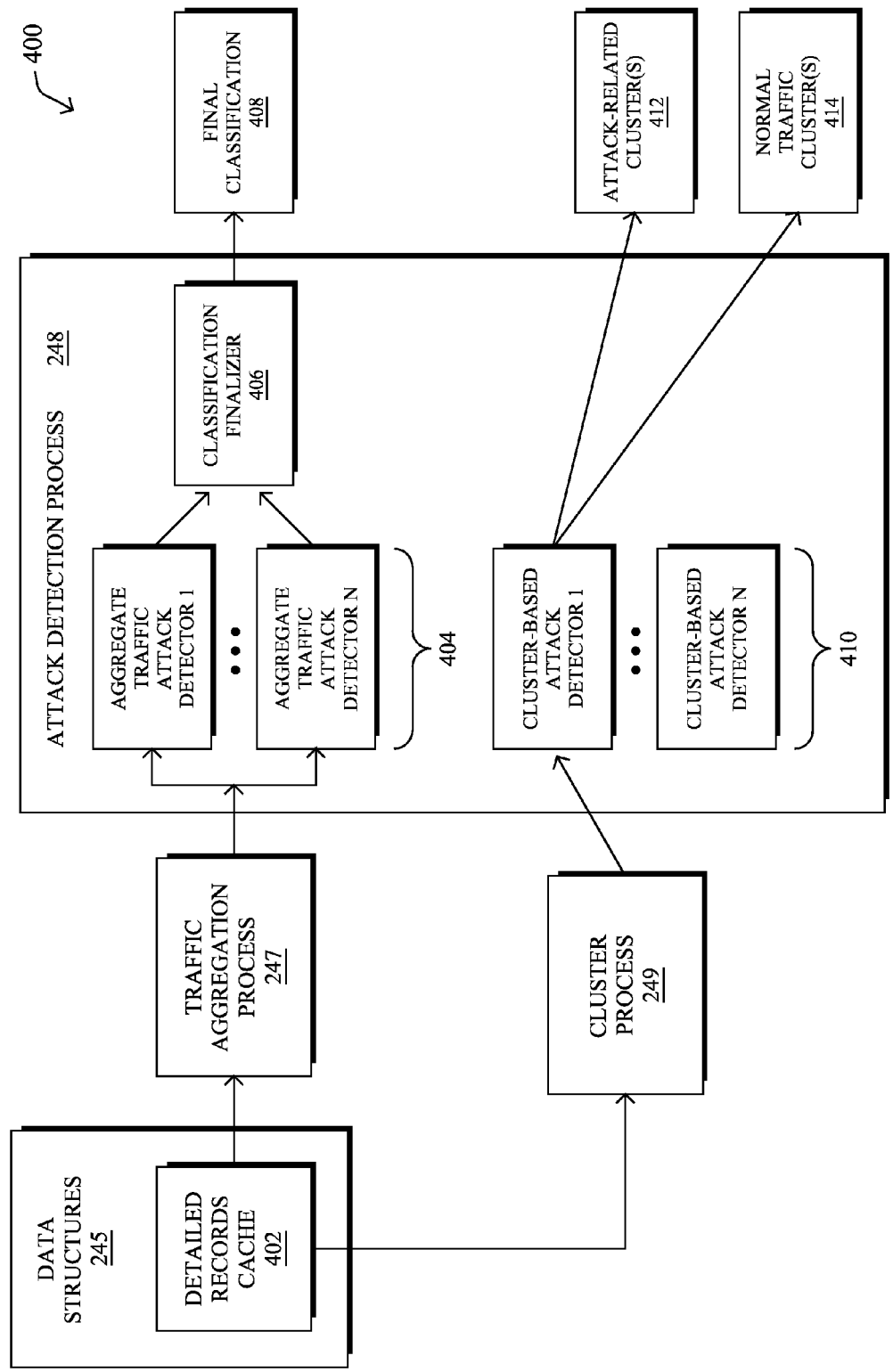
FIG. 4 illustrates an example architecture for segregating out attack-related traffic data.

FIG. 4 illustrates an example architecture 400 for segregating out attack-related traffic data using cluster-specific attack detectors, according to various embodiments. As shown, traffic records may be stored in a detailed records cache 402 (e.g., within data structures 245) and provided to traffic aggregation process 247. In response, traffic aggregation process 247 may generate aggregated metrics for the set of traffic records such as, but not limited to, average flow durations, average traffic sizes (e.g., in bytes), proportions of the different types of traffic (e.g., HTTP, UDP, etc.), or other such information. The aggregated metrics may then be used as input features to any number of attack detectors 404 that are trained to assess the aggregated traffic metrics from traffic aggregation process 247.

In some cases, attack detectors 404 may be configured to use different sets of output labels. For example, one of attack detectors 404 may be configured to simply determine whether or not the aggregated traffic data is indicative of a network attack. However, another one of attack detectors 404 may be configured to classify the aggregated traffic data as either "normal," "UDP flooding attack," or "other attack." In some embodiments, the outputs of attack detectors 404 may be provided to a classification finalizer 406 that selects one of the outputs as a final classification 408. In one implementation, classification finalizer 406 may use a set of output label dependencies from attack detectors 404, to select final classification 408. For example, the "UDP flooding attack" label above may be dependent on the "attack" label from the other attack detector. In such a case, classification finalizer 406 may determine the probability of the "UDP flooding" label as the joint probability of both labels being applied individually.

When attack detectors 404 detect a network attack based on the whole aggregated set of traffic records, attack detection process 248 may initiate further analysis of the set of traffic records using clustering. In particular, cluster process 249 may cluster the corresponding traffic records in the set that triggered attack detectors 404 into different data clusters and provide the clusters to one or more cluster-based attack detectors 410. Notably, attack detectors 410, which are in charge of performing attack detection on a per-cluster basis, take a substantially different kind of information as input with respect to attack detectors 410, which only analyze the whole aggregated traffic. In particular, since clustering by its nature separates data points into based on their similarity (where the notion of similarity depends on a custom distance definition), the composition of the traffic in each cluster from cluster process 249 is potentially very different from that of a complete traffic aggregate from traffic aggregation process 247.

A non-limiting example of the different outputs of traffic aggregation process 247 and cluster process 249 is as follows. First, assume that a traffic aggregate from the records in cache 402 includes DNS traffic, HTTP traffic, and UDP real time traffic. A clustering technique may likely segregate each traffic type into a separate cluster and cluster process 249 may compute aggregated statistics for each of these subsets. Now, even if the traffic in each cluster is completely normal, the aggregated statistics for each cluster may be very different from the aggregated statistics generated by traffic aggregation process 247 across the entire set of traffic data. For example, normal overall traffic will most likely show a 20% to 80% proportion between UDP and TCP traffic, while the flows in a DNS cluster may show a close to 100% proportion of UDP traffic. Therefore, if the features computed on a traffic cluster are provided as input to any of attack detectors 404, which have only been trained with aggregated features computed on complete sets of attack traffic and normal traffic, the classifier output may very well be undetermined (this is most likely the case when the classifier is based on ANNs).

Accordingly, and in various embodiments, one or more cluster-based attack detectors 410 may be trained to specifically analyze the cluster-related data from cluster process 249, which may be generated using a non-supervised clustering technique. In greater detail, for each of the clustering techniques $C_i$ and using two datasets $A_j$ and $N_j$ (corresponding to attack traffic and normal traffic respectively), the associated detector $CD_{ij}$ in cluster-based attack detectors 410 may be trained according to the following procedure:

1. Apply $C_i$ to $N_j$, thus obtaining a set of clusters $\{N_{j1} \ldots N_{jn}\}$.
2. Compute the aggregated features on the traffic flows in each cluster $N_{j1} \ldots N_{jn}$ and assign them a "normal traffic" label.
3. Apply $C_{ij}$ to $A_j$, thus obtaining a set of clusters $\{A_{j1} \ldots A_{jm}\}$.
4. Label each of the clusters as "attack" or "normal traffic".
5. Compute the aggregated features on the traffic flows in each cluster $A_{j1} \ldots A_{jm}$ and assign them the label of the corresponding cluster.
6. Perform classifier training by using the so-obtained data set.

Notably, the above training process may be based on first establishing a ground truth (e.g., that the normal set contains only normal traffic and the attack set contains at least some attack traffic). Such a ground truth may be established in any number of ways. In one embodiment, a human user may manually assign a label to the flow cluster. In another embodiment, an exhaustive search may be conducted to label the traffic flows as attack-related or normal. In particular, a standard attack detector (e.g., one of attack detectors 404) may be used that is trained to recognize aggregate traffic, as opposed to clusters, and all of the possible combinations of clusters may be tested, until the largest cluster combination is found to not cause the classifier to detect an attack. Once the solution has been reached, the clusters in the optimal combinations are labeled as normal traffic, while the remaining ones are flagged as "attack". Notice that, while this technique is computationally expensive, it may still be a viable alternative for purposes of generating training data for attack detectors 410.

Figure 5:
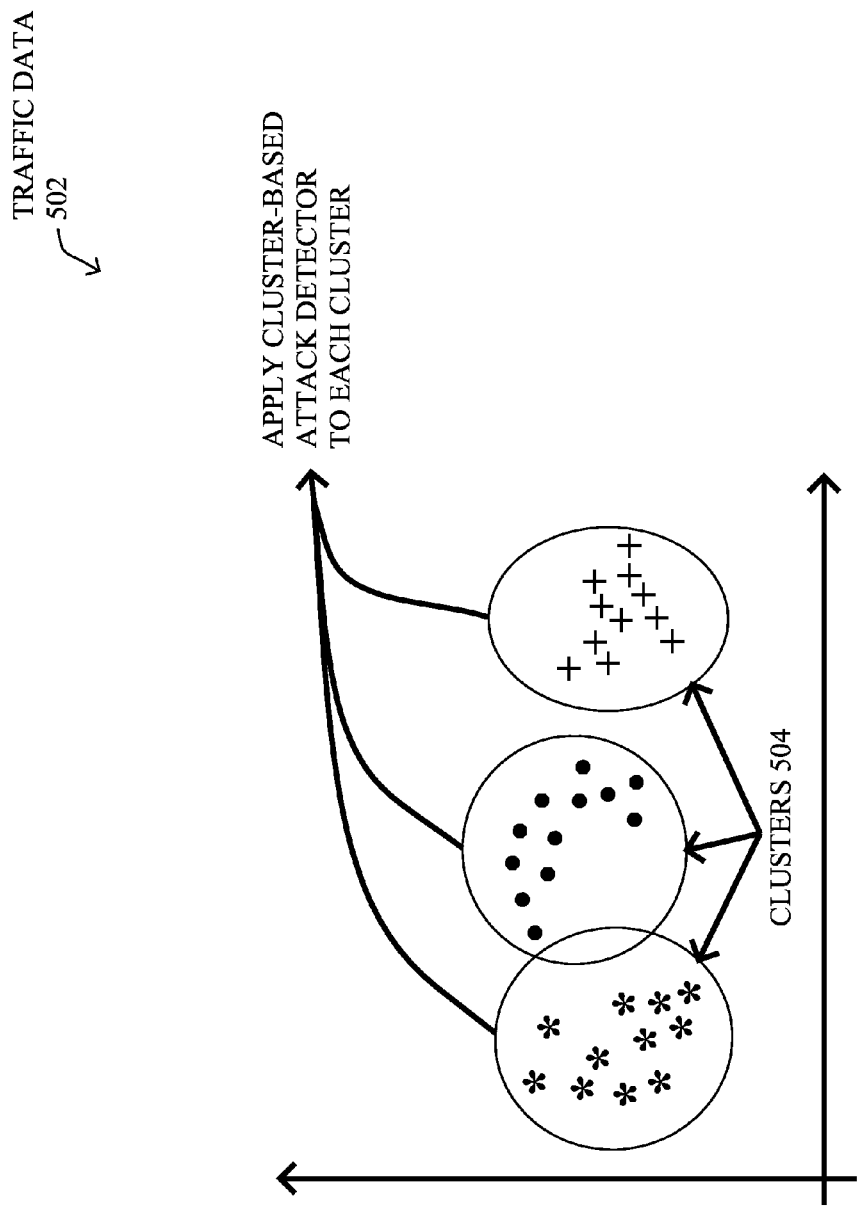
FIG. 5 illustrates an example of traffic data clusters.

Once trained, a cluster-based attack detector 410 may analyze the corresponding clusters, to label each cluster as either "attack-related" or "normal traffic." In other words, one of attack detectors 410 may segregate the analyzed clusters into a set 412 of attack-related clusters (e.g., the clusters that signaled an attack) and a set 414 of normal traffic clusters (e.g., the clusters that were considered safe by attack detector 410. For example, assume that final classification 408 indicates that an HTTP Slow Loris type of attack has been detected using the aggregated set of traffic data. If cluster process 249 uses mean-shift clustering to divide the set of traffic data into clusters A-D, it may provide aggregated metrics for these clusters to an attack detector 410 that has been specifically configured to detect HTTP Slow Loris attacks. In response, attack detector 410 may analyze and label each cluster accordingly, to form sets 412-414 (e.g., clusters A-C contain normal traffic, but cluster D relates to an HTTP Slow Loris attack). In other words, as shown in FIG. 5, the overall set of traffic data 502 may be grouped into clusters 504 (e.g., based on their similarities) and each cluster used as input to a cluster-specific attack detector.

FIGS. 6A-6F illustrate examples of cluster-based attack detection being used to segregate out attack-related traffic data, according to various embodiments. In various implementations, one of the network devices may function as a clustering search engine (CSE). For example, one of controllers/servers 102 (e.g., an NMS, network controller, policy engine, etc.) may act as the CSE. In other implementations, one of nodes/devices 104 may act as the CSE. In general, the CSE is configured to oversee the various cluster processes (e.g., cluster process 249) and cluster detectors (e.g., attack detectors 410) distributed throughout the network.

Figure 6A:
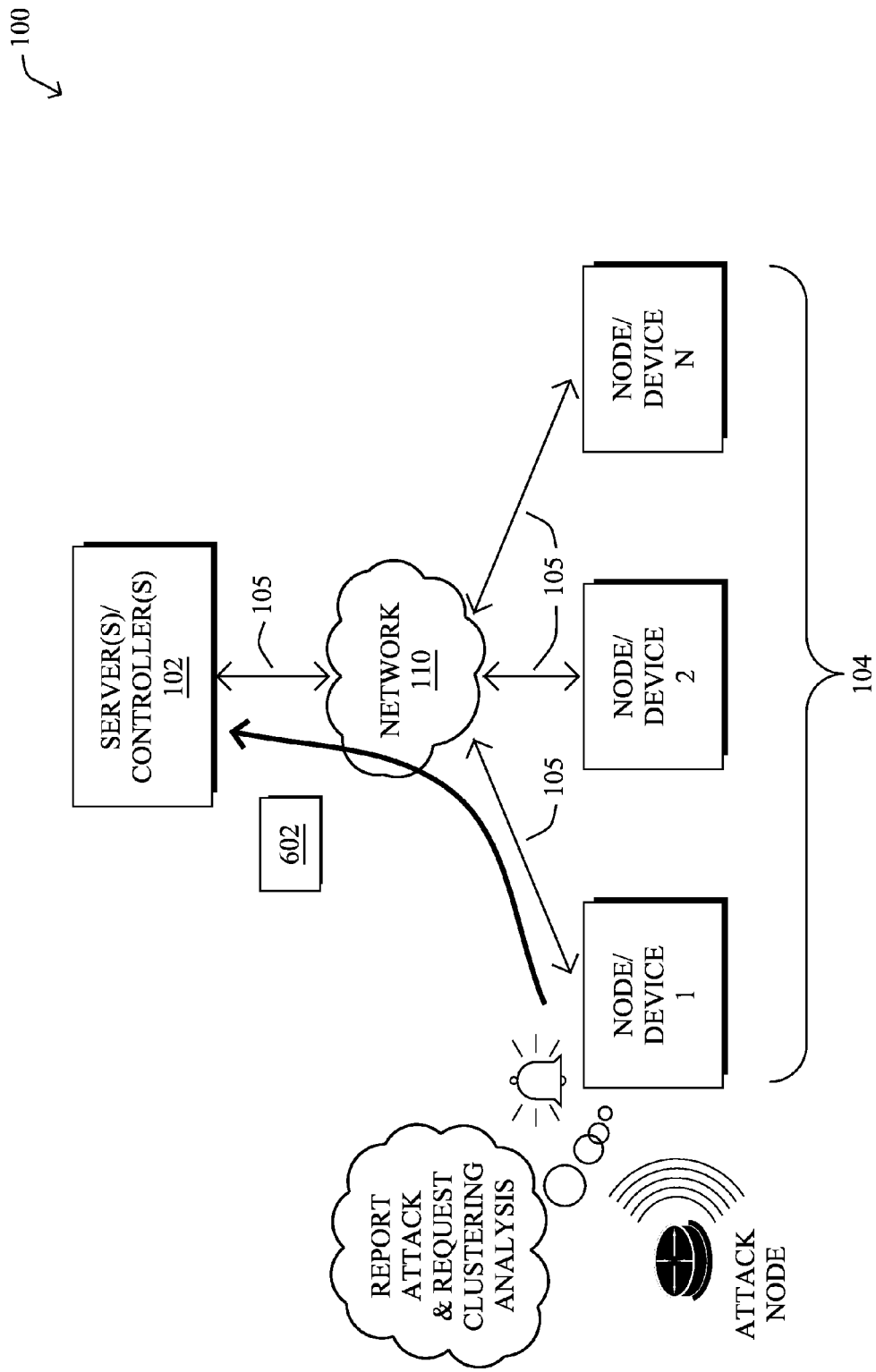

As shown in FIG. 6A, once an attack of type "j" has been detected (e.g., by node/device 1 shown), the device may send a message 602 to the CSE (e.g., one of controllers/servers 102) indicating that an attack was detected. Notably, the attack may be detected by the device using an attack detection classifier trained to analyze aggregated metrics for a complete set of traffic data. In some cases, message 602 may a custom IPv4 or IPv6 message, called Clustering_Classification( ) to request that the CSE identify where the clustering and cluster-based classification can be performed. In some embodiments, message 602 includes any or all of the following type-length-values (TLVs):

- An indication that an attack that has been detected. In some cases, this may also indicate the type of detected attack (e.g., HTTP Slow Loris, etc.).
- A description of the disaggregated data available (e.g., stored in the cache of the sending device). For instance, message 602 may indicate that the available data in the device's cache has n-number of bytes, the duration and application for each traffic flow connection, etc. In some cases, the description may follow the same template as an existing traffic reporting protocol (e.g., using a NetFlow template, etc.).

Figure 6B:
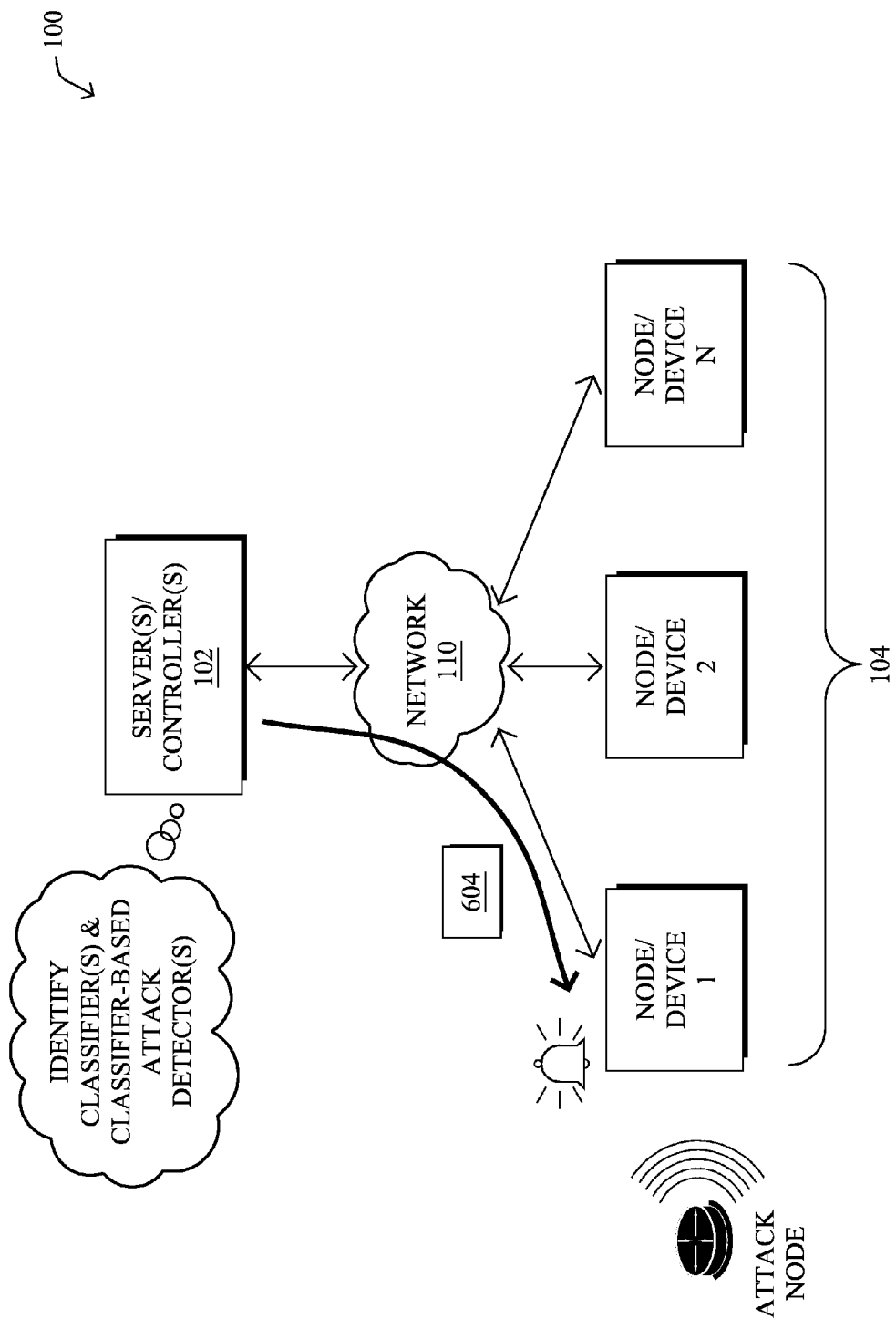

As shown in FIG. 6B, in response to receiving a Clustering_Classification( ) message, the CSE may check the detectors $CD_{ij}$ that are available for the indicated attack and whose input features can be computed with the disaggregated data available. As would be appreciated, this data may be available from the edge router (e.g., node/device 1), in a network management device such as a NMS or a network controller, or in an intermediate node between the edge router and the network management device.

In one embodiment (e.g., a local mode of operation), the CSE is co-located with the device that performs the attack detection and only checks for clustering processes and cluster detectors that are locally available. In other words, node/device 1 may alternatively identify any locally available clustering processes and cluster-based attack detectors.

In another embodiment (centralized mode), as depicted in FIGS. 6A-6B, the CSE is located in some centralized network management device, such as a network controller or a NMS (e.g., one of controllers/servers 104). In this case, the CSE may check for clustering processes and cluster-based attack detectors that are globally available in the network.

In yet another embodiment (distributed mode), multiple CSEs are available and the requesting device sends the Clustering_Classification( ) message to a well-known multicast group. For example, node/device 1 may send message 602 to a multicast group that includes any number of other nodes/devices 104 or controllers/servers 102 configured to act as CSEs.

In any of these embodiments, the CSE(s) may respond to the Clustering_Classification( ) message with a custom IPv4 or IPv6 message called a Clustering_Classification_ Availability( ) message. For example, as shown in FIG. 6B, a CSE may respond to node/device 1 with a reply availability message 604. In various embodiments, message 604 may include any or all of the following TLVs:

- A list of addresses of devices that can perform the clustering on disaggregated data,
- a list of clustering techniques that can be performed (e.g., the list of $C_i$'s),
- a list of addresses of devices that can perform the detection on aggregated data per cluster,
- a list of available cluster detectors (e.g., the list of $CD_{ij}$'s), and/or
- the list of input features of the cluster detectors.

Notably, if there are no cluster-based attack detectors available in the network for the type of attack and/or set of features, message 604 may include an empty list or other indication that no corresponding attack detectors are available. In such a case, the detecting device may use another traffic segregation procedure as a fallback.

On the contrary, if the lists of clustering techniques and cluster-based attack detectors are not empty, upon receiving message 604, the Requestor (e.g., node/device 1) chooses a $C_i$ and a $CD_{ij}$. Once selected, the Requestor may send a message 606 to the device that performs the clustering $C_i$, as shown in FIG. 6C. Message 606 may be a custom IPv4 or IPv6 message, called Perform_Clustering ( ) message, containing any or all of the following TLVs:

- $C_i$: the clustering algorithm that has to be performed,
- the disaggregated data where the clustering has to be applied or the address where the data is available,
- the set of features that have to be computed per cluster, after having computed the clustering on the data,
- the address of the device that will perform the attack detection on aggregated data per cluster, and/or
- $CD_{ij}$: the cluster detector that has to be applied by the device whose address is indicated in the previous TLV.

Figure 6D:
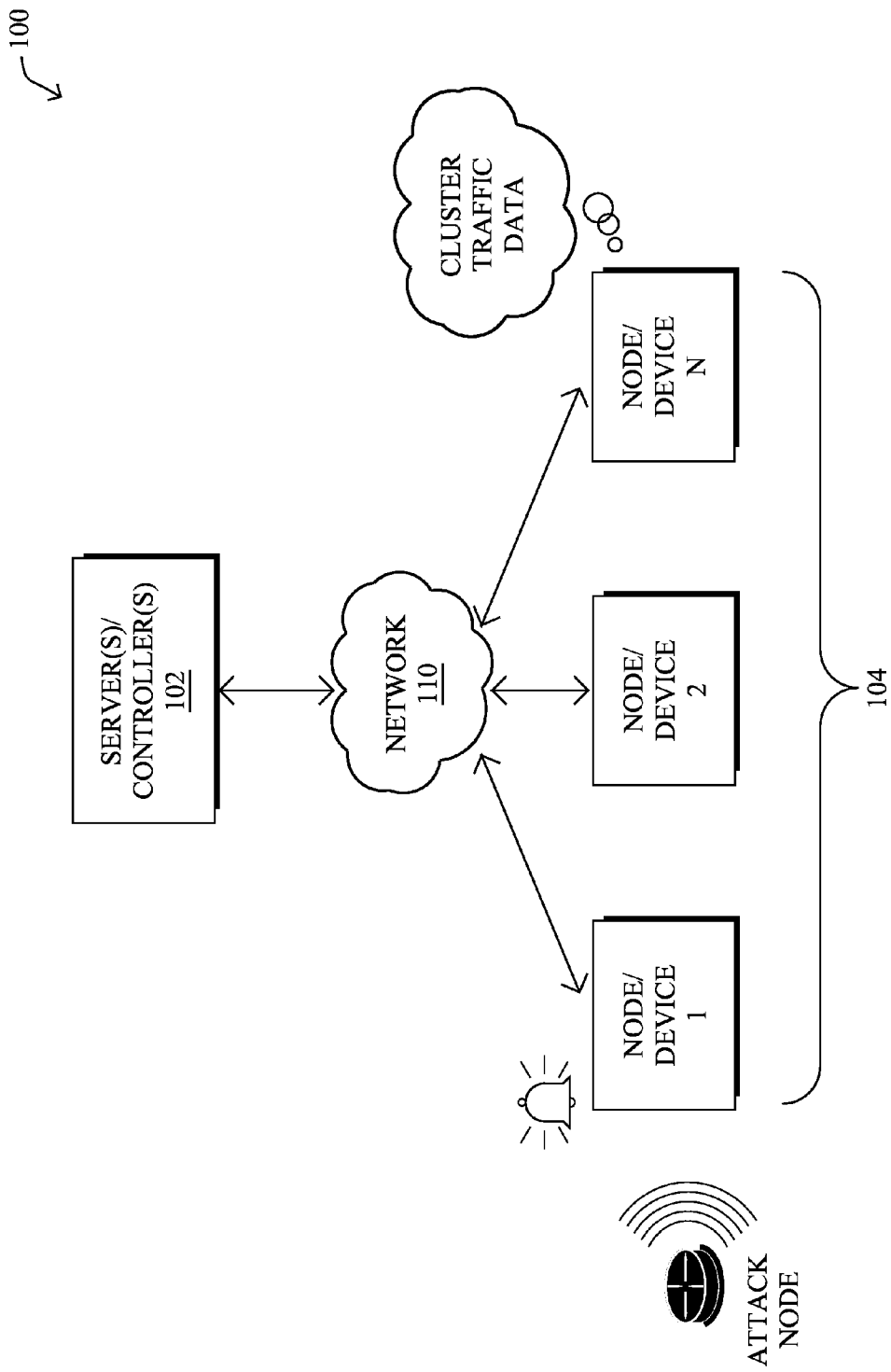

The device selected to perform the clustering is referred to herein as a clustering evaluator (CE). For example, as shown in FIG. 6C, node/device N may be selected by the Requestor as the CE. In response to receiving message 606, the CE may perform the following operations (e.g., by executing cluster process 249):

1.) Apply $C_i$ on the received data. After applying $C_i$ on the data, a set of clusters are generated and each sample of the data set is associated to one of this clusters. For example, as shown in FIG. 6D, node/device N may cluster the data indicated in message 606.
2.) For each cluster generated by the clustering algorithm $C_i$, compute the input features of $CD_{ij}$.
3.) Send to the device indicated in message 606, the features of each cluster previously computed.
4.) Send to the device that will apply $CD_{ij}$, the features computed for each cluster.

Figure 6E:
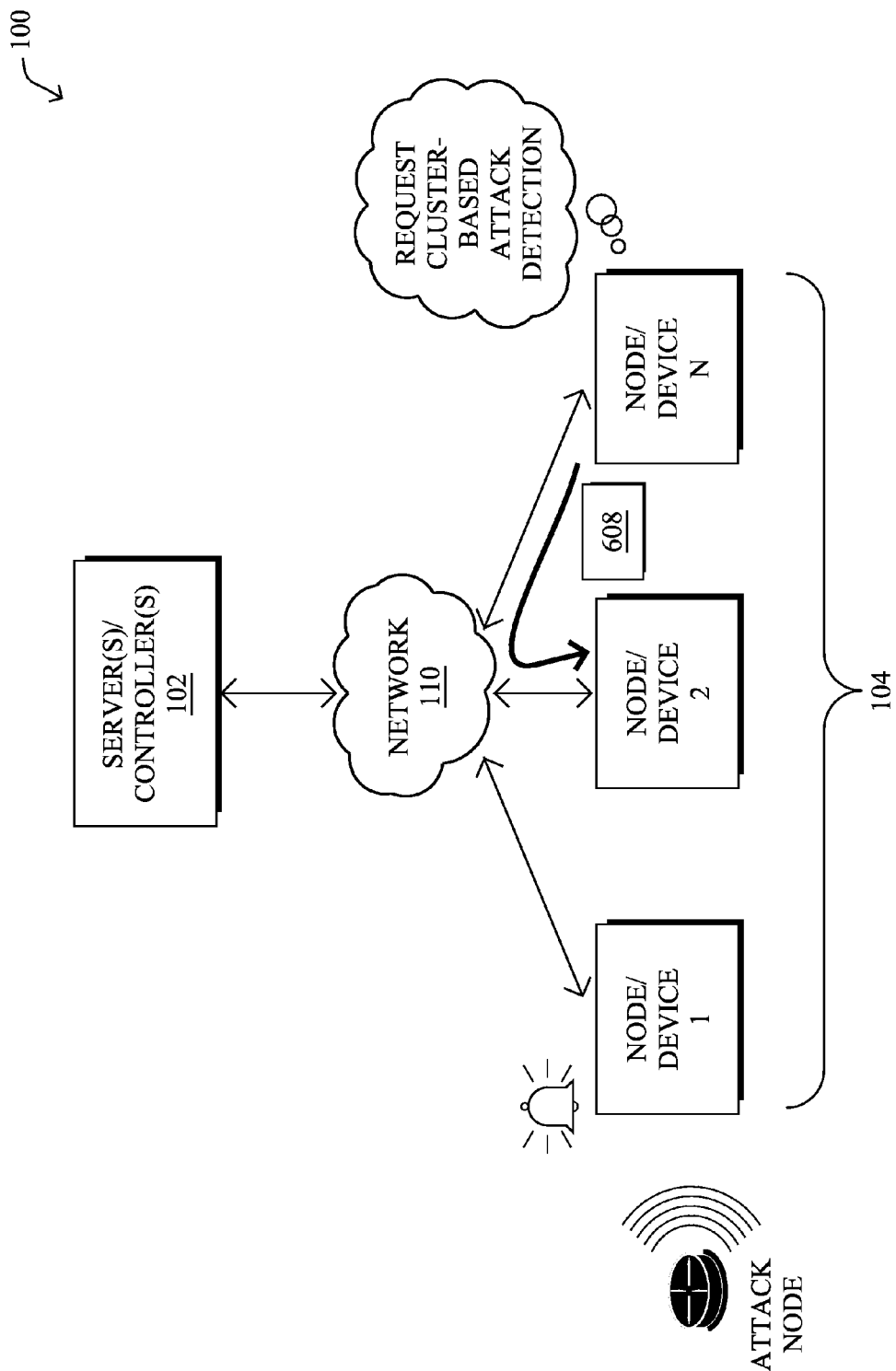
Figure 6F:
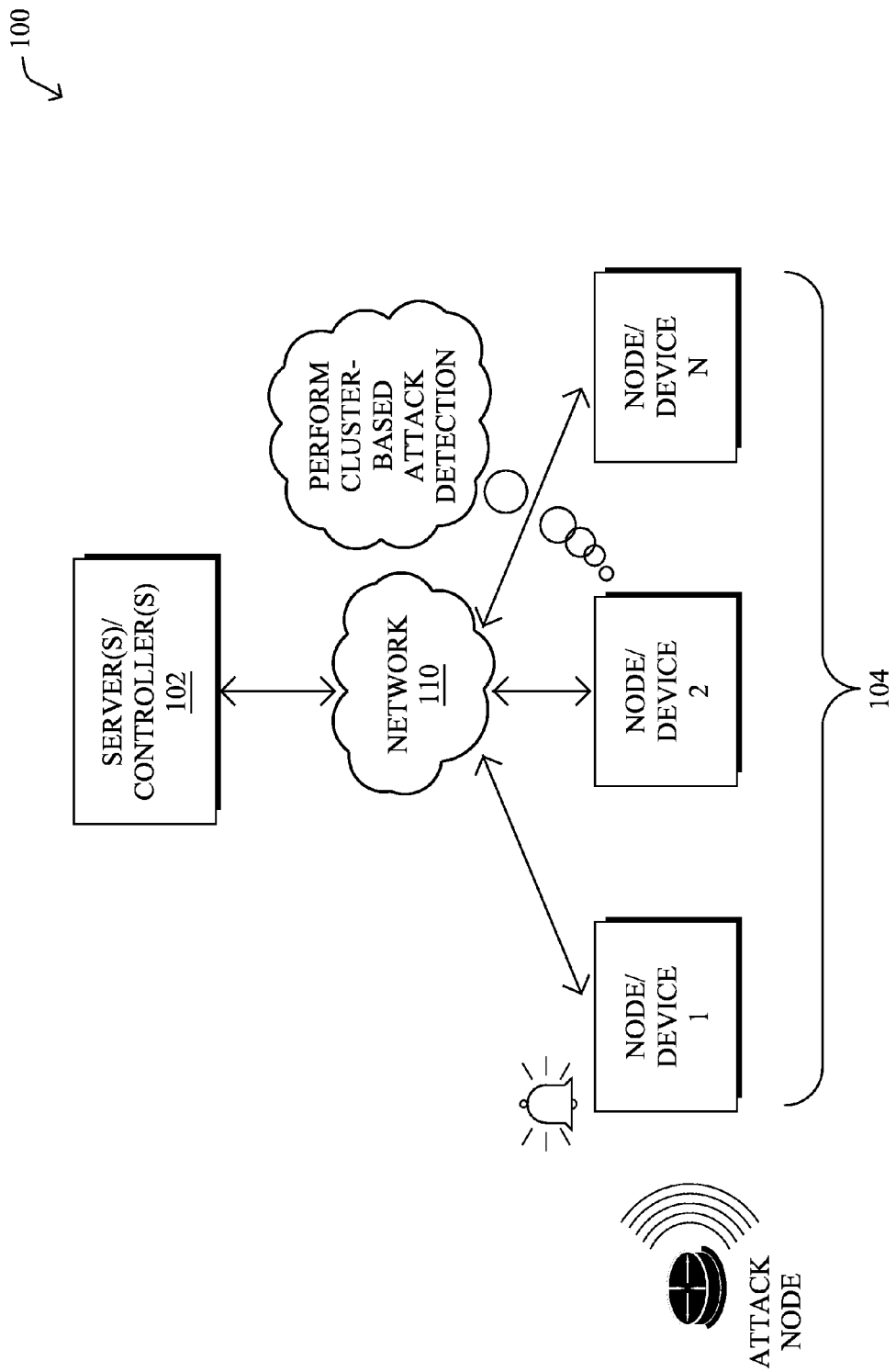

For example, as shown in FIG. 6E, node/device N may classify the data indicated in message 606 and send a corresponding message 608 to node/device 2 that hosts the selected classifier-based attack detector. Message 608 may be a custom IPv4 or IPv6 message, referred to as a Classify_Clusters( ) message, that includes any or all of the following TLVs:

- $CD_{ij}$: the cluster detector that has to be applied, and/or
- the features that have been computed for each cluster.

The device that takes the aggregated features computed by the CE for each cluster and applies the requested attack detector $CD_{ij}$ is referred to as a cluster detector evaluator (CDE). For example, in response to receiving message 608, node/device 2 may apply the requested cluster-based attack detector to the aggregated features in message 608 for each cluster. In particular, the CDE may determine whether the features for each cluster correspond to normal traffic or to attack traffic. If a cluster is classified as normal traffic, the traffic samples in this cluster are treated as normal legitimate traffic. On the contrary, the traffic of cluster(s) that are classified as attack may be flagged as attack traffic and mitigation measures can be started against this traffic.

In one embodiment, the techniques herein may be applied to specific types of detected attack for which radical mitigation measures are used (e.g., dropping the traffic, etc.). For example, attack-related traffic may be prevented from being forwarded to another device in the network. In these cases, a much more refined mechanism may be needed to segregate out attack-related traffic from normal traffic, to prevent the mitigation measures from affecting normal traffic. In some cases, a custom IPv4 or IPv6 message called a Detector_per_Cluster( ) message may be sent, to indicate the list of detected attack types for which cluster-based analysis should be applied. In another embodiment, this information may be included in a TLV embedded in an existing protocol, such as DHCP or Netconf.

Figure 7:
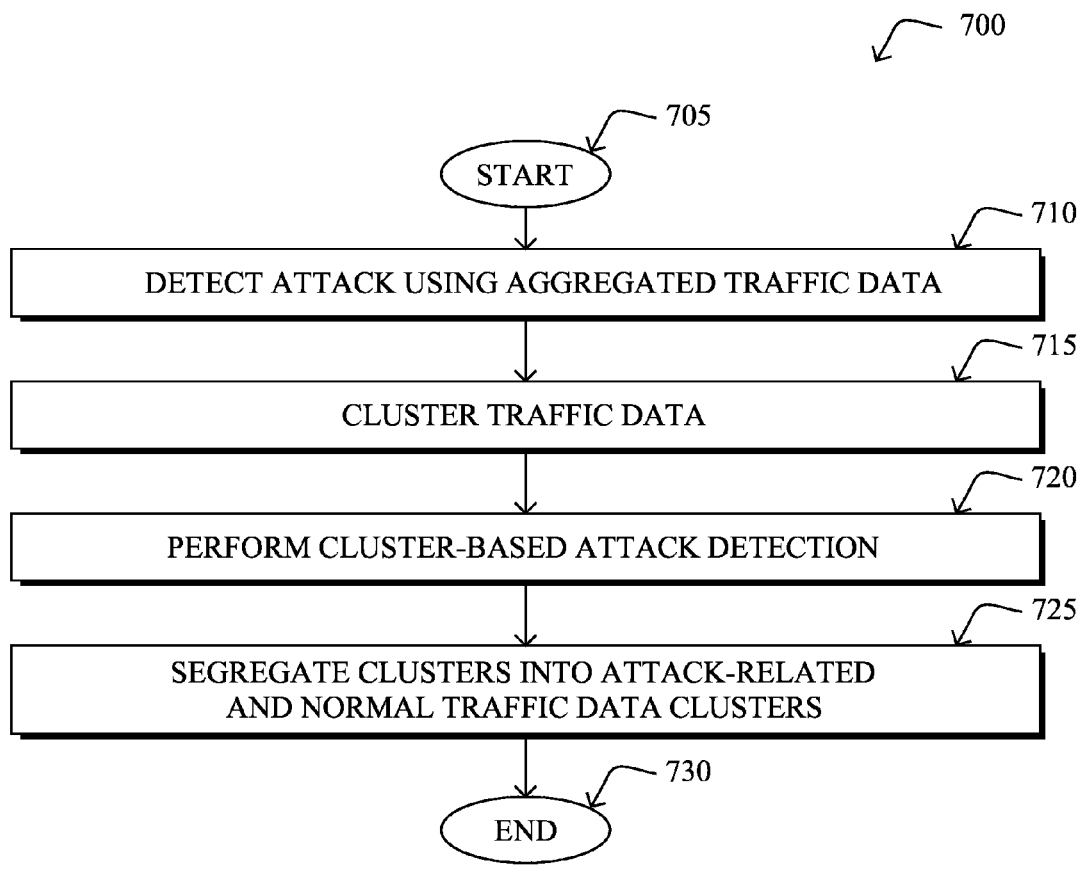
FIG. 7 illustrates an example simplified procedure for segregating out attack-related traffic data using cluster-based attack detection.

FIG. 7 illustrates an example simplified procedure for segregating out attack-related traffic data using cluster-based attack detection in accordance with one or more embodiments described herein. In various embodiments, procedure 700 may be performed by a device in a network such as, etc., any of nodes/devices 104 or controllers/servers 102 described herein. The procedure 700 may start at step 705, and continues to step 710, where, as described in greater detail above, an attack is detected using aggregated metrics for a set of traffic data. In general, as discussed above, the set of traffic data may include data regarding most or all of the complete set of traffic flows present at any given time. For example, the set of traffic data may include, but is not limited to, HTTP traffic, UDP traffic, DNS traffic, and the like. The aggregated metrics may also be any metric that quantifies the set of traffic data in the aggregate (e.g., an average byte size, an average traffic duration, average proportions between different traffic types, etc.).

At step 715, the device causes the set of traffic data to be clustered, as described in greater detail above. In general, the set of traffic data may be clustered such that n-number of data subsets are generated, with each entry in a particular subset having similar characteristics. For example, clustering the overall set of traffic data from step 710 may result in a first cluster that includes HTTP traffic data, a second cluster that includes UDP traffic data, etc. Notably, any number of clustering techniques may be used such as, but not limited to, k-means clustering, mean-shift clustering, DBSCAN clustering, or any other clustering technique. In one embodiment, the device that detects the attack in step 710 also performs the clustering. In another embodiment, the detecting device may instead request that another device perform the clustering. For example, the detecting device may provide an indication of the detected attack type to a clustering search engine and, in response, receive an availability notification that identifies the device to perform the clustering.

At step 720, the device causes cluster-based attack detection to be performed on the clusters from step 715, as described in greater detail above. In general, a cluster-based attack detector may be trained to specifically analyze clusters of a given type. For example, an attack detector may be trained to analyze aggregated metrics for each cluster generated by a mean-shift clustering process. Such an attack detector may label each cluster as being attack-related (or related to a particular type of attack) or relating to normal traffic. In one embodiment, the cluster-based attack detector is executed on the same device that detected the attack initially in step 710. In another embodiment, the cluster-based attack detector may be executed by the same device that performed the clustering (e.g., the CE). In a further embodiment, the cluster-based attack detector may be executed on a different device entirely. In such a case, the CE may forward the requisite cluster information to the device executing the cluster-based attack detector.

At step 725, the device causes the traffic data clusters to be segregated into a set of one or more attack-related clusters and into a set of one or more clusters related to normal traffic, as described in greater detail above. In particular, the one or more cluster-based attack detectors from step 720 may label each cluster as either attack-related or normal traffic. These labels may then be used to segregate the corresponding traffic for each cluster into the attack-related set and normal traffic set. As noted previously, the cluster-based attack detection may be performed by the device itself or, alternatively, the labels applied by another device performing the cluster-based attack detection may be provided back to the device for further processing. For example, in response to identifying the attack-related traffic, the device may take any number of mitigation measures, such as dropping the attack-related traffic. Procedure 700 then ends at step 730.

The techniques described herein, therefore, allows for a deeper analysis of a set of traffic data that triggered an attack detector in the aggregate. In some aspects, the set of traffic data may be clustered and attack detectors that have been specifically trained to analyze the clustered data may assess whether each cluster is indicative of an attack. Accordingly, attack-related traffic may be flagged for mitigation and/or to report the attack-related traffic to a network administrator (e.g., to develop rules to handle the attack-related traffic in the future).

While there have been shown and described illustrative embodiments that provide for segregating traffic data into attack-related and normal traffic categories, it is to be understood that various other adaptations and modifications may be made within the spirit and scope of the embodiments herein. For example, the embodiments herein have been described with respect to certain attack detection and machine learning techniques. However, the embodiments in their broader sense are not as limited, and may, in fact, be used with other types of attack detection and machine learning techniques. In addition, while certain protocols and network configurations are shown, other suitable protocols and network configurations may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, at a device in a network, a network attack using aggregated metrics for a set of traffic data;
   causing, by the device, the traffic data to be clustered into a set of traffic data clusters, in response to detecting the network attack, wherein the traffic is clustered by providing the traffic data to a clustering device in the network, and the clustering device uses the set of traffic data as input to a clustering process to generate the set of traffic data clusters;
   providing, by the device, an indication of an attack type for the detected attack and a description for the set of traffic data to a clustering search engine;
   receiving, from the clustering search engine, an availability notification that identifies the clustering device, in response to providing the indication of the attack type for the detected attack and the description for the set of traffic data to the clustering search engine, wherein the clustering search engine selects the clustering device based on the attack type and the description for the set of traffic data;

causing, by the device, the clustering device to analyze the traffic data clusters; and causing, by the device, the traffic data clusters to be segregated into a set of one or more attack-related clusters and into a set of one or more clusters related to normal traffic based on an analysis of the clusters by the clustering device.

2. The method as in claim 1, wherein causing the traffic to be clustered comprises:

using the set of traffic data as input to a clustering process executed by the device.

3. The method as in claim 1, wherein the availability notification identifies the clustering device as an attack detection device that hosts one or more attack detectors.

4. The method as in claim 1, wherein causing the one or more attack detectors to analyze the traffic data clusters comprises:

executing, by the device, the one or more attack detectors using the traffic data clusters as input to the clustering device.

5. The method as in claim 1, wherein causing the one or more attack detectors to analyze the traffic data clusters comprises:

providing, by the device, the set of traffic data or the traffic data clusters to another device in the network, wherein the other device causes the clustering device to analyze the traffic data clusters.

6. The method as in claim 1, wherein causing the traffic data clusters to be segregated comprises:

receiving labels that were applied to the traffic data clusters by the clustering device, wherein the labels identify a particular traffic data clusters as attack-related or related to normal traffic; and using the labels to group the traffic data clusters into the set of one or more attack-related clusters and into the set of one or more clusters related to normal traffic.

7. The method as in claim 1, further comprising:

preventing traffic related to the one or more attack-related clusters from being forwarded in the network.

8. The method as in claim 1, wherein the set of traffic data identifies traffic flows in the network, and wherein the set of traffic data is clustered based on one or more of: sizes, durations, applications, or statistical properties associated with the traffic flows.

9. The method as in claim 1, wherein the clustering device is trained using individual clusters of a set of training data, and wherein the attack is detected by an attack detector that was trained using a non-clustered set of the training data.

10. An apparatus, comprising:

one or more network interfaces to communicate with a network;

a processor coupled to the network interfaces and configured to execute one or more processes; and a memory configured to store a process executable by the processor, the process when executed operable to:

detect a network attack using aggregated metrics for a set of traffic data;

cause the traffic data to be clustered into a set of traffic data clusters, in response to detecting the network attack;

provide an indication of an attack type for the detected attack and a description for the set of traffic data to a clustering search engine;

receive, from the clustering search engine, an availability notification that identifies the clustering device, in response to providing the indication of the attack type for the detected attack and the description for the set of traffic data to the clustering search engine, wherein the clustering search engine selects the clustering device based on the attack type and the description for the set of traffic data;

cause the clustering device to analyze the traffic data clusters; and cause the traffic data clusters to be segregated into a set of one or more attack-related clusters and into a set of one or more clusters related to normal traffic based on an analysis of the clusters by the clustering device.

11. The apparatus as in claim 10, wherein the process when executed is further operable to:

use the set of traffic data as input to a clustering process executed by the device, to cause the traffic data to be clustered.

12. The apparatus as in claim 10, wherein the availability notification identifies the clustering device as an attack detection device that hosts one or more attack detectors.

13. The apparatus as in claim 10, wherein the process when executed is further operable to:

execute the one or more attack detectors using the traffic data clusters as input to the clustering device.

14. The apparatus as in claim 10, wherein the process when executed is further operable to:

provide the set of traffic data or the traffic data clusters to another device in the network, wherein the other device causes the clustering device to analyze the traffic data clusters.

15. The apparatus as in claim 10, wherein the process when executed is further operable to:

receive labels that were applied to the traffic data clusters by the clustering device, wherein the labels identify a particular traffic data clusters as attack-related or related to normal traffic; and use the labels to group the traffic data clusters into the set of one or more attack-related clusters and into the set of one or more clusters related to normal traffic.

16. The apparatus as in claim 10, wherein the process when executed is further operable to:

prevent traffic related to the one or more attack-related clusters from being forwarded in the network.

17. The apparatus as in claim 10, wherein the set of traffic data identifies traffic flows in the network, and wherein the set of traffic data is clustered based on one or more of: sizes, durations, applications, or statistical properties associated with the traffic flows.

18. The apparatus as in claim 10, wherein the clustering device is trained using individual clusters of a set of training data, and wherein the attack is detected by an attack detector that was trained using a non-clustered set of the training data.

19. A tangible, non-transitory, computer-readable media having software encoded thereon, the software when executed by a processor operable to:

detect a network attack using aggregated metrics for a set of traffic data;

cause the traffic data to be clustered into a set of traffic data clusters, in response to detecting the network attack, wherein the traffic is clustered by providing the traffic data to a clustering device in the network, and the clustering device uses the set of traffic data as input to a clustering process to generate the set of traffic data clusters;

provide an indication of an attack type for the detected attack and a description for the set of traffic data to a clustering search engine;
receive, from the clustering search engine, an availability notification that identifies the clustering device, in response to providing the indication of the attack type for the detected attack and the description for the set of traffic data to the clustering search engine, wherein the clustering search engine selects the clustering device based on the attack type and the description for the set of traffic data;
cause the clustering device to analyze the traffic data clusters; and
cause the traffic data clusters to be segregated into a set of one or more attack-related clusters and into a set of one or more clusters related to normal traffic based on an analysis of the clusters by the clustering device.

* * * * *